May 14, 1968  J. D. BISHOP ETAL  3,383,582
POWER CONVERSION APPARATUS EMPLOYING A MAGNETIC CONTROL
CIRCUIT FOR ACTUATING GATE TURN-OFF SWITCHES
Filed May 7, 1964  2 Sheets-Sheet 1

INVENTORS  J. D. BISHOP
E. T. CALKIN
F. F. JUDD

BY *Reg M. Porter Jr.*
ATTORNEY

United States Patent Office 3,383,582
Patented May 14, 1968

3,383,582
POWER CONVERSION APPARATUS EMPLOYING A MAGNETIC CONTROL CIRCUIT FOR ACTUATING GATE TURN-OFF SWITCHES
John D. Bishop, Basking Ridge, Edwin T. Calkin, Parsippany, and Frank F. Judd, Chatham, N.J., assignors to Bell Telephone Laboratories, Incorporated, New York, N.Y., a corporation of New York
Filed May 7, 1964, Ser. No. 365,726
8 Claims. (Cl. 321—18)

ABSTRACT OF THE DISCLOSURE

An inverter regulator is disclosed which converts a fluctuating DC supply voltage derived from a rectified AC line voltage into high frequency AC output pulses having constant volt-second area. The inverter includes a pair of gate turn-OFF semi-conductor switches which conduct alternately and connect the DC source to the primary winding of an output transformer supplying current first in one direction and then in the other through the winding. The primary winding is wound on two cores, one of which is arranged to saturate while the other remains substantially linear. A control winding wound on the linear core provides turn-OFF pulses to the switch at the moment the other core saturates, and the switches are gated ON by a load responsive triggering device.

---

This invention relates to power conversion apparatus and more particularly to miniaturized direct-current power supplies.

With the advent of semiconductor technology and printed circuit techniques, great steps have recently been made toward reducing the size of electronic apparatus. Further miniaturization of many devices has been substantially limited, however, by the large size of the power supply components used to provide direct-current operating potentials to the transistorized circuitry. The bulk of 60 cycle power transformers and filters and the size of heat sinks used in series regulator supplies are particularly significant. Nonetheless, in order to insure the safety of those who operate such equipment, the isolation provided by the power transformer is highly desirable. Similarly, some form of output voltage regulation is also normally required for satisfactory operation of the loading circuitry.

Accordingly, it is a principal object of the present invention to provide further miniaturization of such power supply apparatus while retaining the advantages of transformer isolation and output voltage regulation.

In a principle aspect, the present invention takes the form of a power inverter which transforms a fluctuating direct-current supply voltage into output pulses having a high repetition rate and constant volt-second area. The fluctuating direct-current voltage which is supplied to the inverter may comprise rectified, 60 cycle line voltage. In accordance with the invention, the frequency spectrum of the output pulse waveform includes a regulated direct-current component and additional alternating-current components at frequencies near to or greater than the pulse repetition rate. Since this scheme substantially eliminates low frequency components from the output pulse waveform, the required bulk of the power transformer and filtering components may be drastically reduced.

According to a further feature of the invention, a novel inverter circuit is employed which includes a pair of gate turn-OFF semiconductor switches which connect the source of unregulated direct-current voltage to the primary winding of the power transformer. The two switches conduct alternately, supplying current first in one direction and then in the other through the primary winding. According to still another feature of the arrangement, the primary and secondary windings of the transformer are wound on two cores, one of which is arranged to saturate while the other remains substantially linear. In order to provide output pulses of constant volt-second area, a control winding wound on the linear core delivers turn-OFF pulses to the switches at the moment the "soft" core saturates. Still another feature of the inverter circuitry resides in the use of additional control windings wound on the saturable core to provide positive feedback whereby fault-free switching is insured. Further output voltage regulation may be provided by varying the output pulse repetition rate in response to output voltage fluctuations.

These and other objects, features and advantages of the present invention may be more fully understood by considering the following detailed description. In this description, reference will be made to the attached drawings in which.

Figure 1:
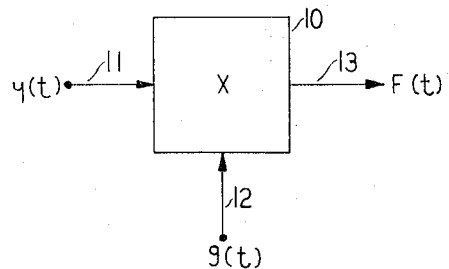
FIGS. 1 and 2 illustrate a principle which underlies the operation of the invention.

The product circuit 10 shown in block form in FIG. 1 of the drawings may be considered in order to more fully comprehend the manner in which the present invention provides inherent output voltage regulation and low-frequency ripple suppression. As shown, product circuit 10 is provided with two inputs 11 and 12 and an output 13. Assume that a signal having the waveform $y_{(t)} = A + B \sin W_v t$ is applied to input 11. This input signal $y_{(t)}$ is modulated by a switching function $g_{(t)}$ which is applied to input 12 with the resulting waveform $F_{(t)}$ appearing at output 13.

Figure 2:
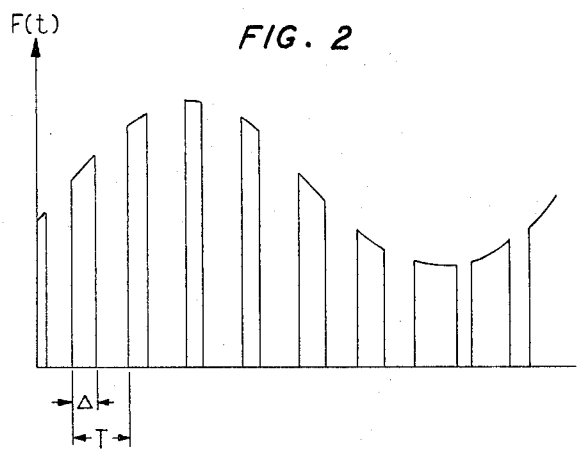

As illustrated by FIG. 2 of the drawings, the switching function $g_{(t)}$ periodically gates the input function $y_{(t)}$ to the output 13. The output pulse repetition rate is constant but the width of each pulse, $\Delta$, is inversely related to the pulse amplitude such that the volt-second area of all the output pulses is held constant. Using the double integral Fourier series analysis outlined by H. S. Black in his text Modulation Theory, chapter 17, D. Van Nostrand (1953), the following expression for the frequency spectrum of the output wave $F_{(t)}$ may be derived:

$$F_{(t)} = \frac{k}{T} + \sum_{m=1}^{\infty} [A_{mo} \cos m\omega_o t + B_{mo} \sin m\omega_o t]$$
$$+ \sum_{m=1}^{\infty} \sum_{n=\pm 1}^{\pm \infty} [A_{mn} \cos (m\omega_o t + 2n\omega_v t) + \cdots$$
$$+ B_{mn} \sin (m\omega_o t + 2n\omega_v t)]$$

where $$A_{mn} + jB_{mn} = \frac{1}{\pi T} \int_0^\pi \int_0^T F_{(t)} e^{j(m\omega_o t + 2n\omega_v t)} d(\omega_o t) d(2\omega_v t)$$

Here, $T$ is the time duration between the leading edges of adjacent output pulses, $\omega_c = 2\pi/T$, and $k$ is the area of each pulse in volt-seconds.

Two important features of the derived output signal may be deduced from the relation given above. First, as might have been expected from the fact that the output pulses have a constant area and occur at a constant rate, the average value of the output waveshape (given by the direct-current term, $k/T$) is independent of the input function $y_{(t)}$. To use the arrangement of FIG. 1 as a direct-current power supply, however, it will also be necessary to suppress or filter out the alternating-current components of the output wave. The size of the filter is reduced over conventional systems by the fact that the low-frequency components have been eliminated since, as can be seen from the equation, components exist only at multiples of the high-frequency pulse repetition rate, and at the sum and difference or "sideband" frequencies.

Figure 3:
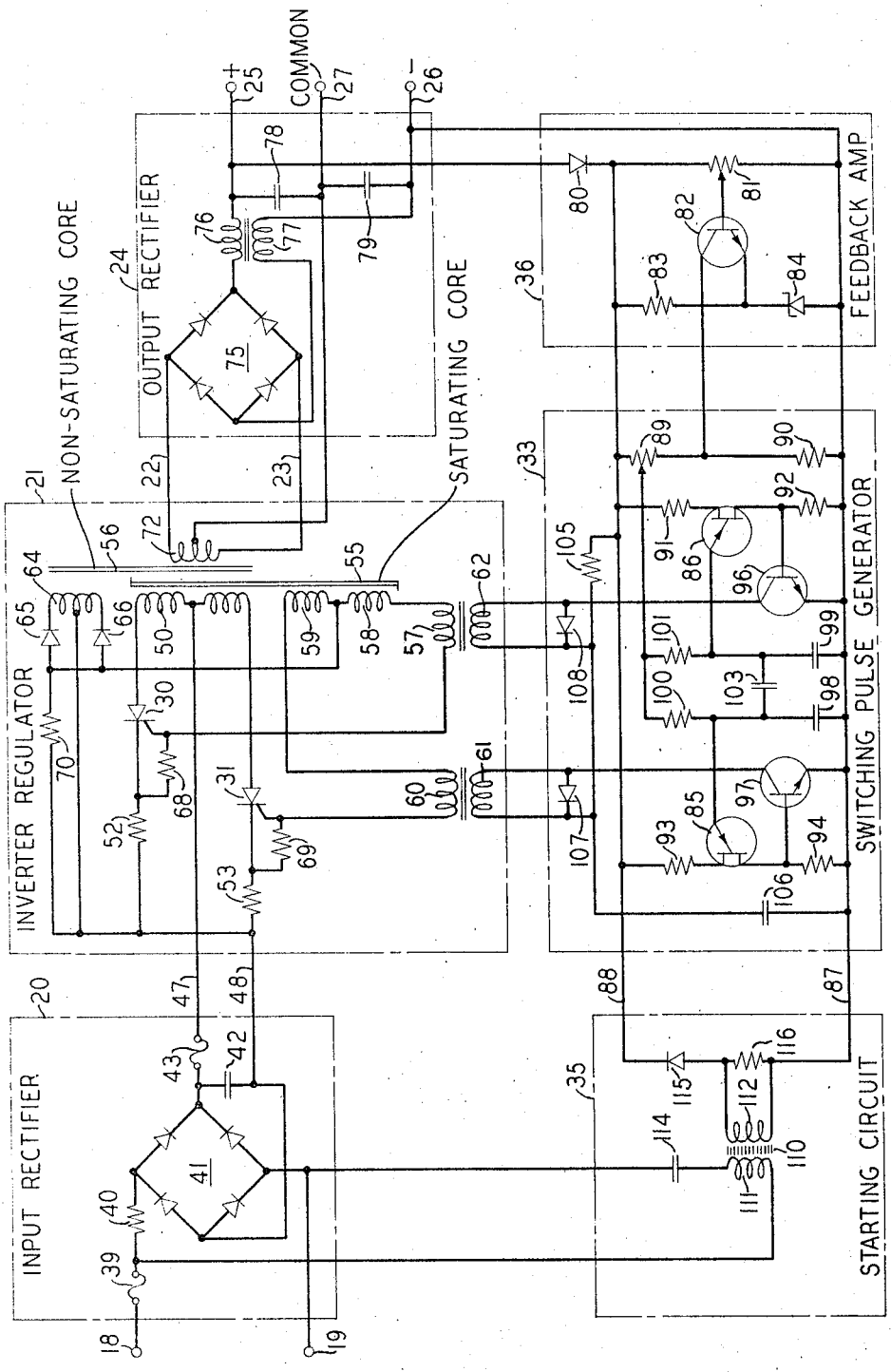
FIG. 3 is a detailed schematic drawing of an alternating-current to direct-current power converter which embodies the principles of the present invention.

FIG. 3 of the drawings shows a detailed schematic drawing of a novel power supply circuit which utilizes the principles discussed above to provide both output voltage regulation and low-frequency ripple suppression.

*Brief system description*

The embodiment of the invention shown in FIG. 3 derives its input power from a single phase, 60 cycle commercial power line. This alternating-current energy is applied to the input terminals 18 and 19 of a rectifier 20 which delivers an unregulated direct-current voltage having a large superimposed 120 cycle ripple content to the input of an inverter-regulator 21. As the name implies, the inverter-regulator is a combinaton of an inverter and regulator, the two functions being inseparable in this circuit. The output voltage appearing between conductors 22 and 23 is a series of approximately rectangular pulses of alternating polarity separated by spaces of zero voltage. An output rectifier and filter 24 converts the pulse waveform from the inverter-regulator 21 into two direct-current output voltages, one of which is positive and appears on output terminal 25 and the other being a negative voltage which is delivered to output terminal 26. Terminal 27 forms a common connection which, if desired, may be grounded.

The inverter-regulator 21 includes two "gate turn-OFF" type semiconductor switches 30 and 31 which conduct in alternation. Switches 30 and 31 are turned ON in response to pulses from a switching pulse generator 33. These switches are held in the ON condition for a time duration which is dependent upon the magnitude of the input voltage from rectifier 20 such that the average value of each output pulse is regulated against changes in input voltage. The novel magnetic switching scheme which accomplishes this function will be discussed in greater detail in conjunction with FIG. 4 of the drawings.

The switching pulse generator 33 is powered during normal operation by the regulated output voltage appearing between terminals 25 and 26. Since no output voltage appears between these terminals until the pulse generator 33 operates, an inital operating potental is derived from the input line voltage by a starting circuit 35.

A feedback amplifier 36 provides second order load voltage regulation by varying the pulse repetition frequency of the turn-ON pulses from generator 33. Should the output voltage across terminals 25 and 26 increase slightly, for example, the output pulse frequency of generator 33 is reduced to lessen the number of constant-area pulses per second delivered to the output rectifier 24.

*Detailed description*

The input rectifier 20 shown in FIG. 3 comprises an input fuse 39, a resistance 40, a diode bridge 41, a capacitor filter 42, and an output fuse 43 connected in a conventional bridge rectifier configuration. The input signal to rectifier 20 is applied across terminals 18 and 19 and may be obtained from a conventional 117 volt, 60 cycle commercial supply. Fuse 39 protects the input wiring from overloads due to short-circuited diodes in bridge 41 or a short-circuited filter capacitor 42. Resistance 40 provides protection to the diode bridge 41 by reducing the starting surge current which charges capacitor 42. The direct-current voltage with superimposed alternating-current ripple developed by rectifier 20 is applied through fuse 43 to the input of inverter-regulator 21 by means of conductor 47 (positive) and conductor 48 (negative).

In the inverter-regulator 21, the positive conductor 47 from rectifier 20 is connected to the center-tap connection on the primary winding 50 of an output transformer. One end of winding 50 is connected to the negative conductor 48 through the series combination of a resistance 52 and the transconducive path of the switch 30. The other end of primary winding 50 is similarly connected to conductor 48 by means of a resistance 53 and the switch 31.

The primary winding 50 is wound around two cores 55 and 56. Core 55, hereinafter called the saturating core, possesses a lower coercive force than does the core 56. Core 55 should also possess a well defined saturation level. The significance of these relative magnetic properties will be more fully appreciated following a consideration of the description of the switching circuitry which follows.

Figure 4:
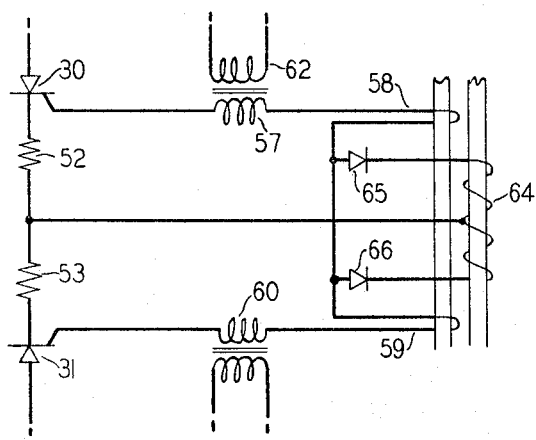
FIG. 4 shows a portion of the circuit of FIG. 3 which has been drawn separately in order to clarify the novel switching action contemplated by the present invention.

To clarify the discussion of the novel magnetic switching action contemplated by the present invention, reference will be made to FIG. 4 of the drawings which shows a portion of the circuit of FIG. 3 redrawn for ease of illustration. In FIGS. 3 and 4, like reference numerals have been used to designate like components.

Both switches 30 and 31 are "gate turn-OFF" devices such as the General Electric type G6D which are each provided with a gate electrode which is adapted to receive switching signals for controlling the conductivity state of the transconductive paths. Each switch is turned ON by positive current flowing into the gate electrode and through the gate-cathode junction and turned OFF by positive current flowing away from the gate electrode. The gate electrode of switch 30 is connected through winding 57 of a pulse input transformer, through control windings 58 and 59 both of which are wound on the saturating core 55, and through winding 60 of a second pulse input transformer to the gate electrode of switch 31.

The switch 30 is turned ON by the application of a pulse to winding 62 which is coupled to winding 57. Turn-ON current flows from winding 57, through the gate-cathode junction of switch 30, through resistances 52 and 53, through the gate-cathode junction of switch 31 in the reverse direction (holding switch 31 in an OFF condition), and through windings 60, 59, and 58.

As can be seen from FIG. 3, when switch 30 conducts, current flows through the upper half of primary winding 50 inducing a flux change in the two cores. Because of its much lower coercive force, however, most of the initial flux change takes place in the saturating core 55. Accordingly, substantial voltages are introduced in the windings 58 and 59 which tend to aid the flow of turn-ON current to the switch 30. Since the operations involved in turning ON the two switches are symmetrical, the turn-ON for one switch only need be described. Note that one current flowing through the series turn-ON loop provides the bias to both semiconductor switches 30 and 31. This current flow is induced by windings 58 and 59 and begins to flow when either switch is turned ON in response to a triggering pulse from the generator 33.

Eventually, the flux level in the saturable core 55 reaches the saturation level and the rate of flux change in core 55 drops quite rapidly, terminating the induced voltages in windings 58 and 59. At the same time, substantial flux changes begin to take place in the nonsaturating core 56, inducing a turn-OFF voltage in winding 64. Two diodes 65 and 66 connect the ends of winding 64 to the junction of windings 58 and 59 and are poled such that, regardless of the polarity of the voltage induced in winding 64, a negative potential will be applied to windings 58 and 59. The center-tap connection on winding 64 is connected to the junction of resistances 52 and 53 to complete the turn-OFF circuits. Thus, when the core 55 saturates, positive current flows from the center-tap on winding 64 toward the cathodes of both switch 30 and switch 31, turning them OFF. The turn-OFF mechanism for each switch is the same.

Because the switches 30 and 31 are turned OFF in response to the saturation of core 55 the output pulse from the inverter-regulator is terminated after a predetermined number of volt-seconds have elapsed. As discussed earlier with regard to FIGS. 1 and 2 of the drawings, this scheme of providing constant area output pulses has the effect of regulating the average value of the output voltage as suppressing low-frequency ripple components. Moreover, the use of additional control windings wound on the saturable core provides positive feedback to eliminate faulty switching which might otherwise be caused by spurious signal disturbances.

Resistors 52 and 53 also serve a valuable function. As the core 55 saturates and the flux in core 56 moves toward saturation, the input current, under heavy output current load conditions, tends to increase making turn-OFF more difficult. This tendency is reduced by using cathode resistors 52 and 53 to provide negaitve feedback in the switch gate circuits.

Resistors 68 and 69, which are included in the inverter-regulator as shown in FIG. 3, shunt the gate-cathode junctions of switches 30 and 31 respectively in order to make the turn-ON and turn-OFF characteristics of the two switches more uniform. A resistor 70, which is connected between the junction of windings 58 and 59 and the center-tap connection of winding 64, is used to reduce any unbalance which might result because of differences in the gate-cathode characteristics of the two switches.

Output secondary winding 72, like the primary winding 50, is wound on both the nonsaturating core 56 and the saturating core 55. A center-tap connection on winding 72 is directly connected to the common output terminal 27. The end connections of winding 72 are connected to the input of a diode bridge 75. The positive output of bridge 75 is connected through choke winding 76 to the positive output terminal 25 while the negative output of bridge 75 is connected through choke winding 77 to the negative terminal 26. By placing the two choke windings on a common core, an effective increase in inductance is obtained without an increase in size. Two filter capacitors 78 and 79 are connected between the common output 27 and the positive output 25 and negative output 26, respectively.

In the circuit of FIG. 3, the volt-second area of the output pulses is not strictly constant due to the delay in turn-OFF resulting from the finite switching times of the gate turn-OFF switches. As a result, a small low-frequency ripple component does appear at the output terminals 25 and 26. In order to provide still further regulation and low-frequency ripple attenuation, therefore, means are included for varying the switching pulse repetition frequency in response to output voltage fluctuations. This is accomplished by the combination of feedback amplifier 36 and switching pulse generator 33.

The feedback amplifier 36 includes a diode 80 and a potentiometer 81 connected between output terminals 25 and 26. Potentiometer 81 is provided with an adjustable tap which is connected to the base electrode of a transistor 82. The series combination of a resistance 83 and a Zener diode 84 is connected in parallel with the resistance 81, the emitter electrode of transistor 82 being connected to the cathode of Zener diode 84. The collector electrode of transistor 82 forms the output of the feedback amplifier 36.

The movable tap on resistance 81 is adjusted such that the base-electrode potential of transistor 82 is slightly greater than the emitter potential, the latter being held constant by Zener diode 84. A small increase in the output voltage across terminals 25 and 26 therefore causes a substantial increase in the conductivity of transistor 82.

The switching pulse generator 33 includes a pair of unijunction transistors 85 and 86, each of which is included in a relaxation oscillator circuit. Power for the two relaxation oscillators is obtained from supply bus 87 which is connected to the negative output terminal 26 and supply bus 88 which is connected to the positive output terminal 25 through the normally forward-biased diode 80. Resistance 90 and potentiometer 89 are connected in series between the two bus conductors 87 and 88 with the collector electrode of transistor 82, the output of the feedback amplifier 36, being connected to the junction of potentiometer 89 and resistance 90. A resistance 91 connects the upper base of unijunction transistor 86 to the positive bus 88 while its lower base is connected to the negative bus 87 by means of the resistance 92. Similarly, resistances 93 and 94 are employed to connect the upper and lower base electrodes, respectively, of unijunction transistor 85 to bus conductors 88 and 87, respectively.

Each relaxation oscillator in pulse generator 33 is provided with an output transistor. The base electrode of transistor 96 is connected to the lower base of unijunction transistor 86 while transistor 97 is connected in a similar manner to the lower base of unijunction transistor 85. The emitters of transistors 96 and 97 are both connected to the negative supply bus 87. The unijunction transistors 85 and 86 are actuated whenever the voltages developed across timing capacitors 98 and 99, respectively, are in excess of the breakdown potential of the associated unijunction device. Timing capacitor 98 is serially connected with a charging resistance 100 between the negative bus 87 and the adjustable tap on potentiometer 89. Likewise, resistance 101 is connected in series with a timing capacitor 99 between the adjustable tap on potentiometer 89 and bus 87. The emitter electrode of each unijunction transistor is connected to the junction of the associated timing capacitor and charging resistance. A coupling capacitor 103 connects the emitters of the two unijunction transistors.

The operation of the two relaxation oscillators is identical except that the output pulses are interlaced in time with the same spacing between each pair of consecutive pulses. Capacitor 99, for example, is charged through resistance 101 at a charging rate which is dependent upon the potential at the movable tap on potentiometer 89. When the potential across capacitor 99 exceeds the breakdown potential of the unijunction device 86, a surge of current is sent through the base resistance 92 turning ON transistor 96 momentarily and discharging capacitor 99. At the same time, capacitor 103 couples a negative pulse to the other timing capacitor 98, reducing its charge. Eventually, the charge on capacitor 98 also reaches the breakdown potential of unijunction transistor 85, turning ON transistor 97.

The collector electrode of transistor 96 is connected through the primary winding 62 and a resistance 105 to the positive bus 88 such that, when transistor 96 is turned ON momentarily by the breakdown of unijunction device 86, a pulse of current is produced in winding 57 turning ON gate turn-OFF device 30 in the inverter-regulator 21. Winding 61 connects the collector of transistor 97 to resistance 105 in the same fashion to complete the turn-ON circuit for the gate turn-OFF device 31. Capacitor 106, which is connected from the resistance 105 to the negative supply bus 87, prevents interaction of the two pulse output circuits. Diodes 107 and 108 are connected in parallel with primary windings 61 and 62 respectively to reduce to negligible magnitude the reverse voltage which develops in these windings following each triggering pulse.

It should be noted that the charging rate of both timing capacitors 98 and 99, and hence the pulse repetition rate developed by the generator 33, is determined by the potential at the tap on potentiometer 89. Because this potential is under the control of the feedback amplifier 36, the rate at which the gate turn-OFF devices 30 and 31 are triggered ON is controlled in part by the output voltage from output rectifier 24. By way of example, assume that the voltage across terminals 25 and 26 drops slightly. In this case, the base potential applied to transistor 82 would also drop, decreasing the conductivity of transistor 82 and raising the potential at the tap on potentiometer 89. This in turn causes the timing capacitors 98 and 99 to charge more rapidly, increasing the output pulse repetition rate from generator 33. The net effect is to increase the number of output pulses delivered to rectifier 24 such that the output voltage across terminals 25 and 26 is held at substantially its former value.

During normal operation, the feedback amplifier 36 and the pulse generator 33 are powered from the output of rectifier 24. Because no output voltage exists until the generator 33 delivers turn-ON pulses to the inverter-regulator 21, however, it is necessary to provide an initial operating potential to the supply bus conductors 87 and 88. Starting circuit 35 performs this function.

Starting circuit 35 includes a transformer having a saturable core 110, a primary winding 111 and secondary winding 112. A capacitor 114 is connected in series with the winding 111 across a source of 60 cycle line voltage obtained between input terminals 19 and the junction of fuse 39 and resistance 40. Secondary winding 112 is connected in series with a diode 115 between supply bus conductors 87 and 88, the diode 115 being poled to allow the flow of positive starting current from winding 112 whenever insufficient operating voltage appears between the conductors 87 and 88.

The operation of the starting circuit depends upon the saturation of core 110 within one-half cycle of the input waveform. When core 110 saturates, the voltage induced across both windings 111 and 112 drops to zero and the entire input voltage appears across capacitor 114. Accordingly, the current through winding 111 leads the input voltage by 90 degrees. When the input voltage reaches its peak magnitude, the current through winding 111 reverses direction and core 110 comes out of saturation. Consequently, an output voltage is induced in winding 112 which again increases until core 110 saturates in the opposite direction at which time the voltage across winding 112 again drops to zero. The voltage induced across winding 112 is therefore a series of pulses of alternate polarity having a 60 cycle per second repetition rate.

Since diode 115 acts as a rectifier, only positive pulses are applied to bus 88 and then only when the potential on bus 88 is less than that induced across winding 112. Only one pulse will normally be necessary to start the circuit. The resistance 116 connected in parallel with winding 112 insures that the blocked starting voltage peaks do not exceed the power supply voltage. Because the core 110 is arranged to saturate and because it needs to deliver very little power to generator 33, the starting circuit may be made quite small in size.

It is to be understood that the above-described embodiment is merely illustrative of an application of the principles of the invention. Numerous modifications may be made by those skilled in the art without departing from the true spirit and scope of the invention.

What is claimed is:

1. In combination, a source of fluctuating direct-current voltage capable of fluctuating from 0 to a maximum value, first and second magnetic cores, said first core having a lower coercive force than said second core, a primary winding wound on both said first and said second cores, a first control winding wound on said first core, a second control winding wound on said second core, a semiconductor switch having a control electrode and a transconductive path, said path being connected to supply current from said source to said primary winding whenever a turn-ON signal is applied to said control electrode, means including said first control winding for supplying a turn-ON signal to said control electrode when said first core is unsaturated and means including said second control winding for supplying a turn-OFF signal to said control electrode when said first core saturates.

2. The combination set forth in claim 1 wherein said means for supplying turn-ON signals to said control electrode includes a source of trigger pulses for initiating the application of turn-ON signals to said control electrode, said source of trigger pulses supplying pulses having a relatively small magnitude in comparison to the voltage developed across said first control winding when said first core is energized below its saturation level.

3. The combination set forth in claim 2 wherein said source of trigger pulses comprises a source of pulses having a constant repetition rate.

4. The combination as set forth in claim 2 wherein said source of trigger pulses includes means for varying the repetition rate of said trigger pulses in response to changes in the average magnitude of energy delivered to said load circuit.

5. In combination, a source of a fluctuating direct-current voltage, a transformer having a saturating core and a nonsaturating core, primary and secondary windings wound on both of said cores, a pair of switching means having ON and OFF conditions for connecting said source to said primary winding in said ON condition and for disconnecting said source from said primary winding in said OFF condition, a load circuit connected to said secondary winding, a control circuit including a winding on said saturating core for holding one of said switching means in said ON condition and the other of said switching means in said OFF condition while said saturating core is unsaturated, and including a winding on said nonsaturating core for placing said switching means in said OFF condition at the moment said saturating core saturates.

6. Power apparatus comprising, in combination, a source of alternating-current energy, means for rectifying said alternating-current energy to provide fluctuating direct-current energy, a load circuit, switching means for repetitiously gating said direct-current energy to said load circuit such that said load circuit receives a series of pulses, and means responsive to the instantaneous magnitude of said direct-current energy for varying the duration of each of said pulses in inverse relation to said magnitude such that all of said pulses have a substantially equal energy content.

7. Apparatus as set forth in claim 6 wherein said means for varying the duration of said pulses comprises a transformer having a saturable core interposed between said switching means and said load circuit and control means responsive to the saturation of said core for opening said switching means to terminate each of said pulses.

8. Apparatus as set forth in claim 6 including means responsive to the average amount of energy delivered to said load for varying the repetition rate of said pulses in inverse relation to said amount whereby said amount is regulated.

References Cited

UNITED STATES PATENTS

| 3,092,786 | 6/1963 | Bayne | 321—45 X |
|---|---|---|---|
| 3,097,335 | 7/1963 | Schmidt | 321—47 X |
| 3,205,426 | 9/1965 | Mills | 321—18 |
| 3,221,241 | 11/1965 | Greenberg et al. | 321—18 X |
| 3,237,126 | 2/1966 | Baycura et al. | 331—113 |
| 3,281,644 | 10/1966 | Moore et al. | 321—45 |
| 3,207,975 | 9/1965 | Pintell | 321—16 |
| 3,246,227 | 4/1966 | Strohmeier | 331—113 X |
| 3,313,997 | 4/1967 | Pinckaers | 321—18 |

JOHN F. COUCH, *Primary Examiner.*

WM. SHOOP, *Assistant Examiner.*